United States Patent [19]

Hausinger

[11] Patent Number: 4,572,018
[45] Date of Patent: Feb. 25, 1986

[54] VEHICLE TRANSMISSION ARRANGEMENT

[75] Inventor: Otto Hausinger, Gerlingen, Fed. Rep. of Germany

[73] Assignee: Dr. Ing. h.c.F. Porsche Aktiengesellschaft, Weissach, Fed. Rep. of Germany

[21] Appl. No.: 598,986

[22] Filed: Apr. 11, 1984

[30] Foreign Application Priority Data

Apr. 21, 1983 [DE] Fed. Rep. of Germany ....... 3314413

[51] Int. Cl.$^4$ ...................... F16H 35/06; B60K 20/00; B60K 20/02
[52] U.S. Cl. .................................. 74/397; 74/473 R; 74/396; 74/395
[58] Field of Search ............. 74/397, 396, 395, 473 R, 74/475; 384/519, 583; 248/660

[56] References Cited

U.S. PATENT DOCUMENTS

| | | | |
|---|---|---|---|
| 2,771,169 | 11/1956 | Wahlstrom | 74/396 |
| 3,106,851 | 10/1963 | Ivanchich | 74/475 |
| 4,344,334 | 8/1982 | Schmittbetz et al. | 74/473 R |
| 4,377,093 | 3/1983 | Janson | 74/473 R |
| 4,404,867 | 9/1983 | Mueller et al. | 74/397 |
| 4,455,883 | 6/1984 | Radcliffe | 74/473 R |

FOREIGN PATENT DOCUMENTS

| | | | |
|---|---|---|---|
| 476821 | 5/1927 | Fed. Rep. of Germany | 74/397 |
| 1217218 | 5/1966 | Fed. Rep. of Germany | . |

Primary Examiner—Lawrence J. Staab
Assistant Examiner—M. Bednarek
Attorney, Agent, or Firm—Barnes & Thornburg

[57] ABSTRACT

In an automotive vehicle transmission consisting of a synchronized gearshift transmission and a bevel-gear axle transmission driven by an output shaft of the gearshift transmission, the output shaft is movable with a bearing clamping plate to set the bevel gear contact play. In order to avoid, after setting of the gear contact play, having to readjust the shifting rods with respect to the sliding sleeves of the synchronizers, all of the gearshifting elements of the gearshift actuation as well as of the blocking interlock and preselection route blocking mechanisms are mounted on the bearing clamping plate and participate in the setting motion of the latter.

12 Claims, 8 Drawing Figures

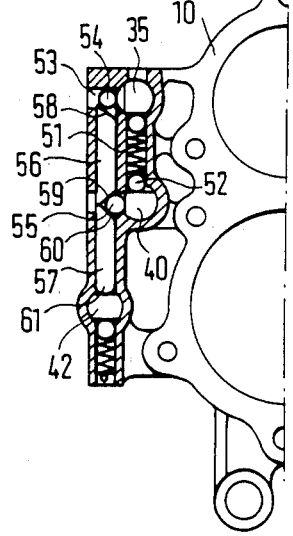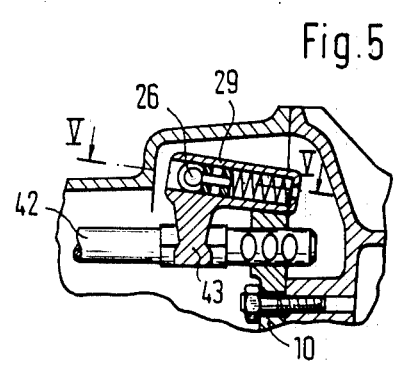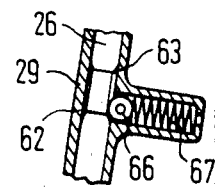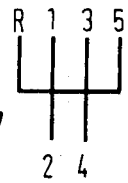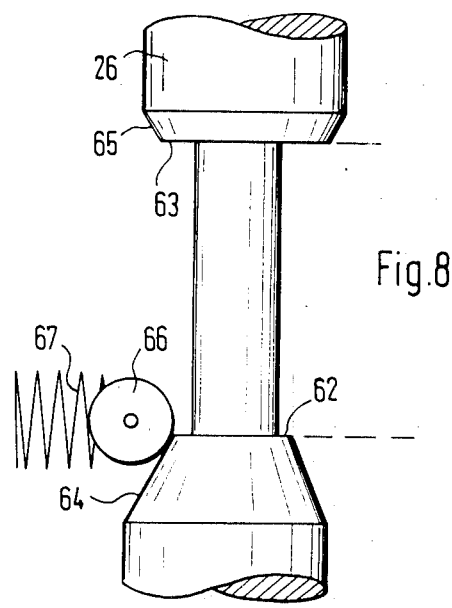

VEHICLE TRANSMISSION ARRANGEMENT

BACKGROUND AND SUMMARY OF THE INVENTION

The invention relates generally to automotive vehicle transmissions which include means for adjusting the position of the output gear connecting the transmission to an axle of the vehicle. The invention particularly relates to such transmissions which include within a casing an input shaft, an output shaft, and a plurality of shift rods positioned generally parallel to the input and output shafts to provide means for manipulating the coupling sleeves of synchronizers to provide operation of a selected gear in a gear train connecting the input and output shafts, the output shaft extending through a partition within the casing to connect to an axle of the vehicle.

Such an automotive vehicle transmission is disclosed in German Patent No. 1,217,218. A combined housing is provided for an axle transmission and a gearshift transmission with a partition being formed therebetween accommodating one bearing for the output shaft and for the output gear attached to an end face of the output shaft. The bearing for the output shaft and the output gear can be axially displaced to adjust the correct contact of the output gear teeth to the axle. In order to avoid readjustment of the shift rods lying parallel to the output shaft, and/or of the shifting forks connected thereto, with respect to the coupling sleeves moved concomitantly with the axial displacement, the shifting rods and their blocking means are arranged in an extension of the bearing flange so that they participate in each case in the axial displacement.

However, this construction still has a disadvantage remaining in that the selector shaft supporting the gearshift fingers engaging grooves of the shift rods is itself supported in the transmission casing and must be readjusted after setting the output bevel gear contact. For this purpose, the gearshift fingers are attached to the selector shaft by means of releasable clamping screw means. In order to render the selector shaft readily accessible from the outside, the transmission casing is divided in the immediate vicinity of the selector shaft so that, after removing one half of the housing, readjustment can be effected.

The object of this invention resides in designing and arranging the gearshifting elements of the automotive vehicle transmission in such a way that readjustment becomes unnecessary after setting of the output bevel gear contact.

This object is achieved by providing a support for the bearing of the output shaft and gear which includes means for supporting the selector shaft and other portions of the selector means for coordinate movement with the bearing during the initial setting of the play between the output bevel gear and the vehicle axle. The support comprises a bearing clamping plate of a special construction designed to arrange all of the shifting elements for the gear preselection and gearshifting operation as well as for the interlock and preselection route blocking mechanisms thereon so that they participate in the sliding movement during setting of the bevel gear play and thus readjustment can be omitted.

In order to obtain a compact, space-saving arrangement of the bearing clamping plate, the selector control shaft supported in the bearing clamping plate acts by way of the gearshift fingers on a selector sleeve, the axis of which extends along the bearing clamping plate and perpendicularly to the shifting rods, and is likewise mounted in the bearing clamping plate. Accordingly, all gearshift elements can be integrated into the bearing clamping plate. The latter can be inserted in the casing as a preassembled module. Since no readjustment of the gearshift forks whatever is required, the latter can be pinned to the shifting rods.

Additional features and advantages of the invention will become apparent to those skilled in the art upon consideration of the following detailed description of a preferred embodiment exemplifying the best mode of carrying out the invention as presently perceived. The detailed description particularly refers to the accompanying figures.

BRIEF DESCRIPTION OF THE DRAWINGS

FIG. 4 is a sectional view taken along line IIb—IIb of FIG. 2.

FIG. 5 is a sectional view taken along line IIc—IIc of FIG. 2.

FIG. 6 is a sectional view taken along line V—V of FIG. 5.

FIG. 7 is a gearshift diagram of a five speed, four-route shifting pattern.

FIG. 8 is an enlarged schematic illustration of the preselection route blocking mechanisms.

DETAILED DESCRIPTION OF THE DRAWINGS

Figure 1:
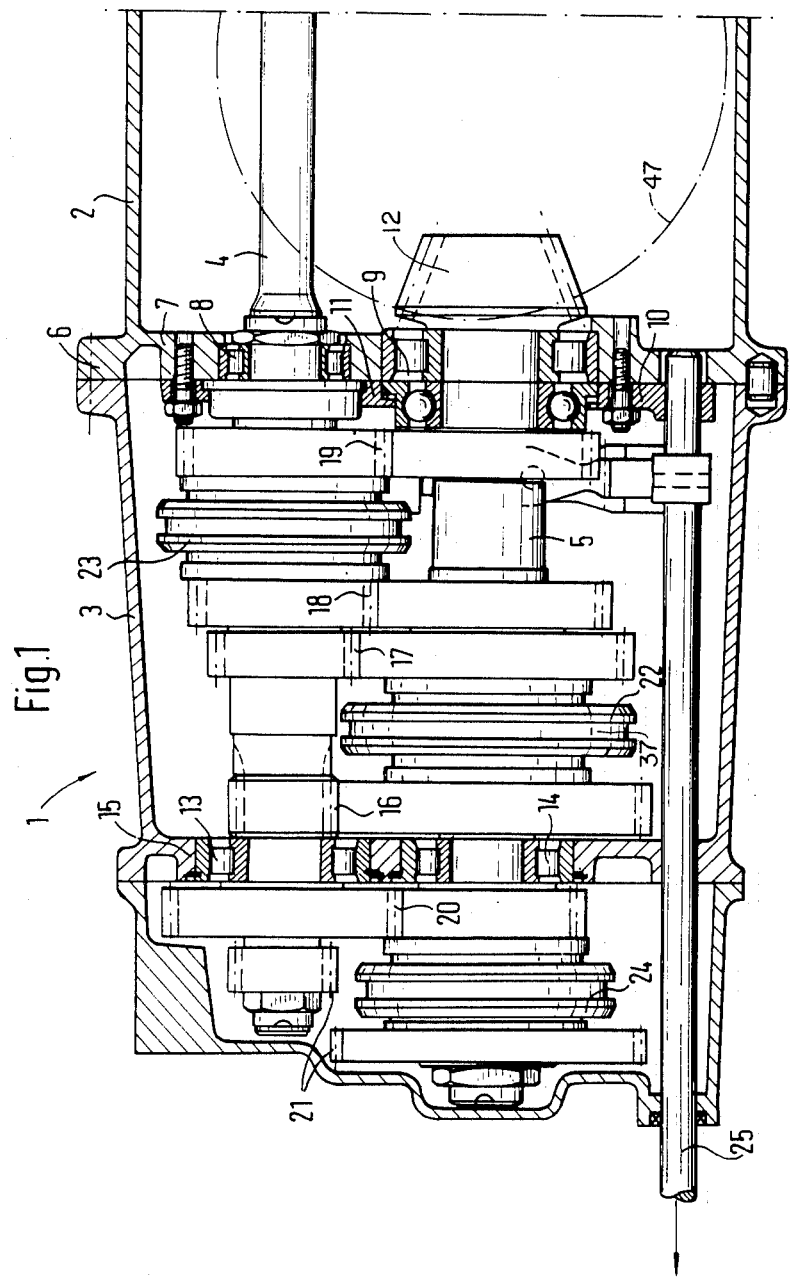
FIG. 1 is a longitudinal sectional view through a five-speed automotive vehicle transmission showing the input and output shafts with interconnecting gear-train.

In a transmission casing 1, composed of an axle housing 2 and a gearshift housing 3, there are arranged an input shaft 4, emanating from the rear of an engine, not shown, and, in parallel thereto, an output shaft 5 to serve as an axle drive means. The axle housing 2 is connected by threaded fasteners to the gearshift housing 3 at a flange connection 6. The axle housing 2 is provided at this location with a partition 7 containing a bearing 8 for the input shaft 4 and a bearing 9 for the output shaft 5. These bearings are held in place by a bearing clamping plate 10. With the interposition of spacer disks 11, bearing 9 is displaceable in the longitudinal direction for setting the contact play of a bevel gear 12 attached to the end face of the output shaft 5. The two other bearings 13 and 14, for the input shaft 4 and output shaft 5, respectively, are arranged in a partition 15 at the opposite end of the gearshift housing 3.

On the right side of the partition 15 as viewed in FIG. 1, in this sequence, lie the gear pairs 16, 17, 18, 19 for the first, second, third, and fourth gears. To the left of the partition 15, the gear 20 is provided for the fifth gear, and the gear pair 21 for reverse gear. The meshing gear pairs of the forward gears each consist of a fixed gear and a loose gear and are shiftable by synchronizers 22, 34, and 23 therewith. The shifting motion is introduced into the transmission by a selector control shaft 25 operated manually by way of a gearshift lever, not shown.

This selector control shaft 25 is supported to be longitudinally and rotationally movable in the gearshift housing 3 as well as in the bearing clamping plate 10.

Figure 2:
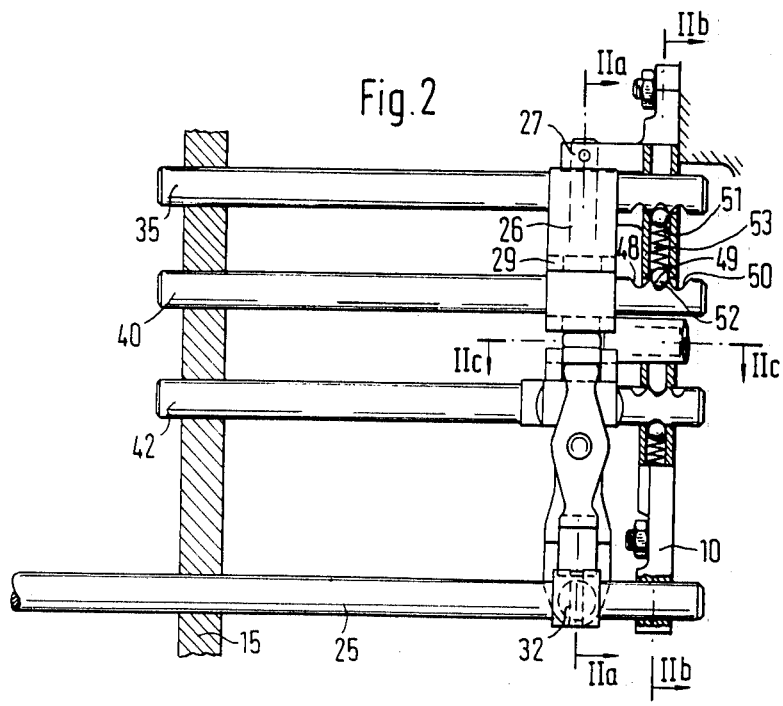
FIG. 2 is another longitudinal sectional view taken behind FIG. 1 showing the arrangement of the selector control shaft and the shifting rods with resilient gear-holding locking device.
Figure 3:
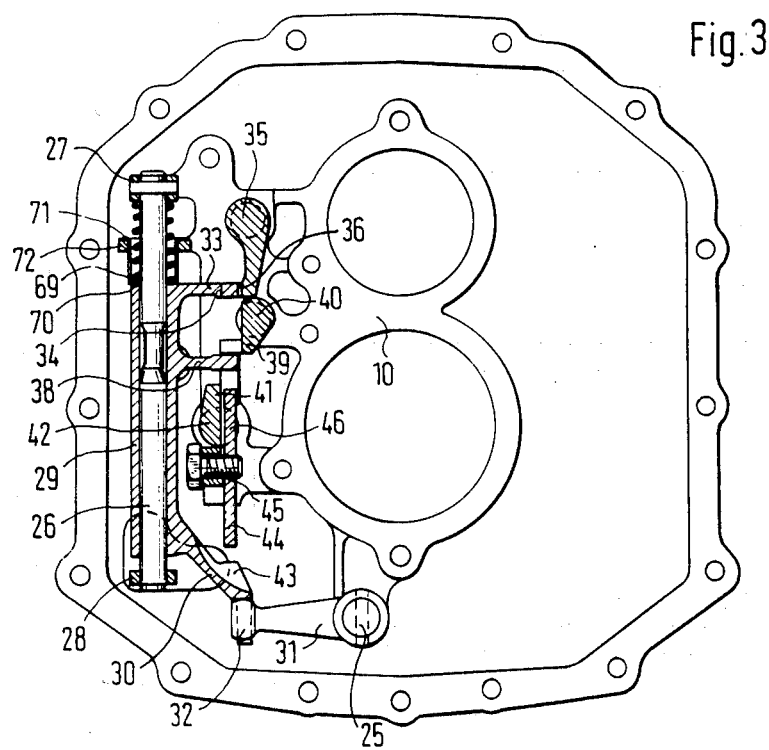
FIG. 3 is a sectional view taken along line IIa—IIa of FIG. 2 and showing the bearing clamping plate and housing schematically.

A selector shaft 26 is mounted in bearing blocks 27 and 28 on the bearing clamping plate 10 as shown in FIG. 2 and FIG. 3. The bearing blocks 27 and 28 serve simultaneously as stops for a tubular selector sleeve 29 guided in a longitudinally and rotationally movable fashion on the selector shaft 26. An arm 30 is cast integrally with the selector sleeve 29 at one end of the latter. Arm 30 is connected to an arm 31 fixed to the selector control shaft 25 by way of a flexible connection such as a ball type swivel joint 32.

A gearshift finger 33 is cast integrally with the selector sleeve 29 at the other end thereof and engages into a groove 34 of a shifting lug 36 attached to a shifting rod 35 to longitudinally displace the latter. By this arrangement, the third gear can be engaged in one end position of the shifting rod 35 by way of a gearshift fork (not shown) pinned or otherwise fixed thereto, which gearshift fork engages into an annular groove 37 of the synchronizer 22 shown in FIG. 1. In the other end position, shifting into the fourth gear can be accomplished in a similar manner.

A second gearshift finger 38 shown in FIG. 3 can engage, in one longitudinal position of the selector sleeve 29, into a groove of a shifting lug 39 attached to a shifting rod 40 for the first and second gears. In the other longitudinal position of the selector sleeve 29, the gearshift finger 38 engages into the groove of a shifting lug 41 attached to a shifting rod 42 of the fifth gear. To engage reverse gear, a shifting finger 43 attached to the arm 30 engages a lever arm 44 of a reversing fishplate 45 mounted at the bearing clamping plate 10, the other lever arm 46 of which cooperates with the shifting rod 42.

Since this gear preselection and gearshift actuation system, comprising components 25 through 46, is mounted to the bearing clamping plate 10, this system participates in any adjustment motion of the bearing clamping plate necessary for setting the bevel gear contact play between the bevel gear 12 and the plate-bevel gear 47 of the axle transmission. The gearshift fork engaging into the annular grooves of the shifting sleeves of the synchronizer can be pinned or fixed together with the shifting rods since they need not be readjusted with respect to the annular grooves after setting of the bevel gear contact play.

As can be seen from FIGS. 2 and 4, the bearing clamping plate 10 likewise accommodates all individual parts of the gear-holding locking device, parts 48–53, and of the blocking interlock, parts 54–61, of the shifting rods 35, 40, 42.

In order to lock in the individual shifting positions, the shifting rod 40 is provided with three grooves 48, 49, 50 cooperating with a detent ball 52 urged into contact by means of a spring 51. The detent ball 52 and the spring 51 lie in bore 53 of the bearing clampling plate 10. Groove 48 resiliently locks the first gear, groove 49 fixes the zero or neutral position, while groove 50 locks the second gear in place, but all of these actions can be overcome by the application of a shifting force. The shifting rods 35 and 42 are provided with similar locking means.

The blocking or interlock device, parts 54–61, shown in FIG. 4, prevents the simultaneous shifting of two gears. A wedge-shaped groove is arranged in the shifting rod 35 as well as in the shifting rod 40. These grooves cooperate with locking balls 54, 55 located in bores of the bearing clamping plate 10 extending perpendicularly to the bore 53. The bore 53 contains two locking pins 56 and 57. The locking pin 56 includes inclined surfaces 58 and 59 at its end faces. Locking pin 57 has an inclined surface 60 on one end cooperating with the locking ball 55 and, on the other end, has a rounded zone 61 engageable into a groove of the shifting rod 42.

The mode of operation of the blocking device is as follows: If the locking pin 57 is pushed upwardly along the wedge-shaped groove by operation of the shifting rod 42, inclined surface 60 of pin 57 urges the locking ball 55 into the groove of the shifting rod 40. At the same time, the locking pin 56 is also pushed upwards and blocks the shifting-rod 35 by means of the ball 54. If one of the two shifting rods 35 or 40 is operated, the corresponding locking ball travels outwardly along the groove and blocks the two other shifting rods by means of the locking pins and the other locking ball.

FIGS. 5, 6, and 8 show a preselection route blocking mechanism, parts 62–72, likewise arranged in the bearing clamping plate 10. For this purpose, the selector shaft 26 has a recess defined by stepped shoulders 62 and 63 which connect the inner diameter to conically turned portions 64 and 65. The stepped shoulders and conically turned portions cooperate with a roller 66 which is longitudinally movable perpendicularly to the selector shaft 26 in a bore of the bearing clamping plate and is supported by a spring 67. The smaller stepped shoulder 62 marks the transition of the fifth gear and evokes a shifting force of about 35 Newtons. The adjoining conically turned portion 64 with shallow slope serves for producing a restoring force for urging the reversing lever back into the neutral position, lying in the shifting plate of the third and fourth gears. The larger stepped shoulder 63 effects a shifting force of about 75 Newtons, necessary for producing a markedly noticeable pressure point during shifting into reverse gear.

If the selector sleeve is moved in the direction toward reverse gear, a compression spring 68 is simultaneously tensioned along with the spring 67. This compression spring 68 is housed in a spring cup 69 on the end face 70 of the selector sleeve and is supported against a bearing block 27 of the selector shaft 26 as shown in FIG. 3. The flanged rim 71 of the spring cup 69 is held in contact with a stop 72 of the bearing clamping plate 10.

Although the invention has been described in detail with reference to an illustrated preferred embodiment, variations and modifications exist within the scope and spirit of the invention as described and as defined in the following claims.

What is claimed is:

1. An automotive vehicle transmission comprising an input shaft, an output shaft, a gear-change train, including switching rods for selectively shifting the gear ratio between the input and output shafts in dependence on the position of said switching rods, a selector shaft means for directly controlling the position of the switching rods, and a common bearing support means for said output shaft and said selector shaft means for maintaining said output shaft and said selector shaft in a predetermined relative position with respect to one another, whereby a single adjustment of said output shaft will similarly adjust said selector shaft means.

2. The transmission according to claim 1, wherein the selector shaft means is disposed in a selector sleeve situated for longitudinal displacement and rotational movement on the selector shaft means, and wherein the common bearing support means comprises bearing blocks positioning the selector shaft means perpendicularly to the switching rods, the selector sleeve being selectively engageable with any of the shift rods for manipulation thereof.

3. The transmission according to claim 2, wherein the selector shaft means includes a pair of opposed stepped shoulders and wherein the selector sleeve includes a resiliently biased member engageable with the stepped shoulders to provide a back pressure which must be overcome by a shifting force of sufficient magnitude to be easily perceived by an operator of the vehicle when encountered.

4. The transmission according to claim 1, wherein the common bearing support means comprises a bearing clamping plate of bipartite construction such that the longitudinal position of the input shaft and the output shaft can be separately adjusted.

5. A transmission according to claim 1, wherein said input shaft is also supported in said common support means.

6. A transmission according to claim 5, wherein said common support means comprises a bearing plate.

7. A transmission according to claim 1, wherein said common support means comprises a bearing plate.

8. A transmission according to claim 2, wherein said common support means comprises a bearing plate, and wherein said bearing blocks are directly supported at the bearing plate.

9. A transmission according to claim 3, wherein said common support means comprises a bearing plate, and wherein said bearing blocks are directly supported at the bearing plate.

10. A transmission according to claim 6, wherein said bearing plate is of bipartitie construction such that the longitudinal position of the input shaft and the output shaft can be separately adjusted.

11. A transmission according to claim 7, wherein said bearing plate is of bipartitie construction such that the longitudinal position of the input shaft and the output shaft can be separately adjusted.

12. A transmission according to claim 8, wherein said bearing plate is of bipartitie construction such that the longitudinal position of the input shaft and the output shaft can be separately adjusted.

* * * * *